Figure 1:
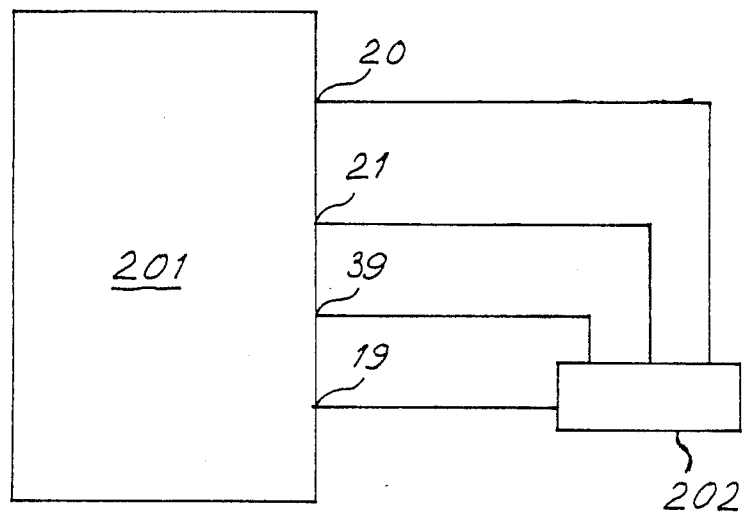

United States Patent [19]

Hartwig et al.

[11] Patent Number: 4,550,282

[45] Date of Patent: Oct. 29, 1985

[54] METHOD AND DEVICE FOR CONTROLLING A BRUSHLESS ALTERNATING CURRENT MOTOR

[75] Inventors: Carl S. M. Hartwig, Täby; Erik A. Ljung, Stockholm; Erik M. Obel, Danderyd, all of Sweden

[73] Assignee: Institut CERAC S.A., Ecublens, Switzerland

[21] Appl. No.: 473,743

[22] Filed: Mar. 9, 1983

[51] Int. Cl.$^4$ .............................................. H02P 5/40
[52] U.S. Cl. .................................. 318/808; 318/798; 318/806
[58] Field of Search ......................... 318/729, 807–811, 318/798, 806; 363/56

[56] References Cited

U.S. PATENT DOCUMENTS

| | | | |
|---|---|---|---|
| 3,387,205 | 6/1968 | Tesdall | 323/285 |
| 3,500,158 | 3/1970 | Landau et al. | 318/805 |
| 3,662,247 | 5/1972 | Schieman | 318/808 |
| 3,978,383 | 8/1976 | Carthy | 318/808 |
| 4,028,599 | 7/1977 | Zankl et al. | 318/671 |
| 4,371,824 | 2/1983 | Gritter | 318/811 |
| 4,420,718 | 12/1983 | Saki et al. | 318/729 |

*Primary Examiner*—David Smith, Jr.
*Attorney, Agent, or Firm*—Eric Y. Munson

[57] ABSTRACT

A method and a device for controlling a brushless alternating current motor (23) driven by an inverter (31–36) connected to a direct current supply (24,25). The direct current supplied to the inverter is sensed. The signal is passed through a peak detector (41) to a regulator (45), which decreases its frequency controlling output signal if the peak value input signal exceeds a predetermined value. A control signal corresponding to the torque demand of the motor is also produced. This signal controls the voltage supplied to the motor. Negative pulses at the turning off of the inverter switches are also sensed and used for controlling the degree of magnetization of the motor.

4 Claims, 5 Drawing Figures

METHOD AND DEVICE FOR CONTROLLING A BRUSHLESS ALTERNATING CURRENT MOTOR

The present invention relates to a method and a device for controlling a brushless alternating current motor driven by an inverter connected to a constant voltage direct current supply.

In prior art solutions for controlling motors of the above mentioned kind it has been customary to sense the current supplied to the motor terminals. Since the current supplied to the motor terminals contains both active and reactive components more or less sophisticated devices have been used to obtain some information about the efficiency of operation of the motor. Examples of this are given in U.S. Pat. Nos. 3,619,749 and 4,207,510.

The present invention uses a different approach in that all information needed is taken out by means of sensing the direct current fed to the inverter and passing the sensed signal through a peak detector and a regulator, as defined in the appended claims, to obtain a control signal for controlling the operation of the inverter. Since the voltage and frequency supplied to the motor terminals are entirely controlled by controlling the operation of the inverter, the voltage of the direct current source will be substantially constant. This means that all variations in the operational state of the motor are reflected in variations in the direct current supplied to the inverter.

By means of the present invention a number of advantages may be obtained. It is possible to use simpler and thus cheaper components. The direct current can be sensed simply by connecting two conduits at a distance from each other to one of the leads to the inverter. No current transformers or Hall elements are needed. Optimal voltage and frequency giving low losses can be supplied to the motor over a wide range of operating conditions. High output power relative to the size of the motor is obtainable.

The present invention, which is defined by the appended claims, is mainly characterized in that a peak value of the direct current is sensed and that the frequency of the current supplied to the motor terminals is decreased by a regulator if the peak value exceeds a preset limit value.

According to an advantageous embodiment of the invention a rectified mean value of the direct current is sensed. This value is then divided by the frequency controlling signal to obtain a voltage controlling signal that is proportional to the torque of the motor. This latter signal is used to increase the voltage supplied to the motor when the torque demand increases. This ensures high efficiency of operation of the motor.

According to a further advantageous embodiment of the invention negative pulses obtained when the switching elements of the inverter are switched off are sensed. The sensed signal is then used to control the voltage supplied to the motor terminals such that these pulses obtain a predetermined level. The magnitude of these negative pulses reflect the magnetic state of the motor. By controlling the magnitude of the pulses it is possible to obtain sufficient magnetization of the motor to give a high power to weight ratio yet avoiding oversaturation which would result in unacceptable losses.

Figure 2:
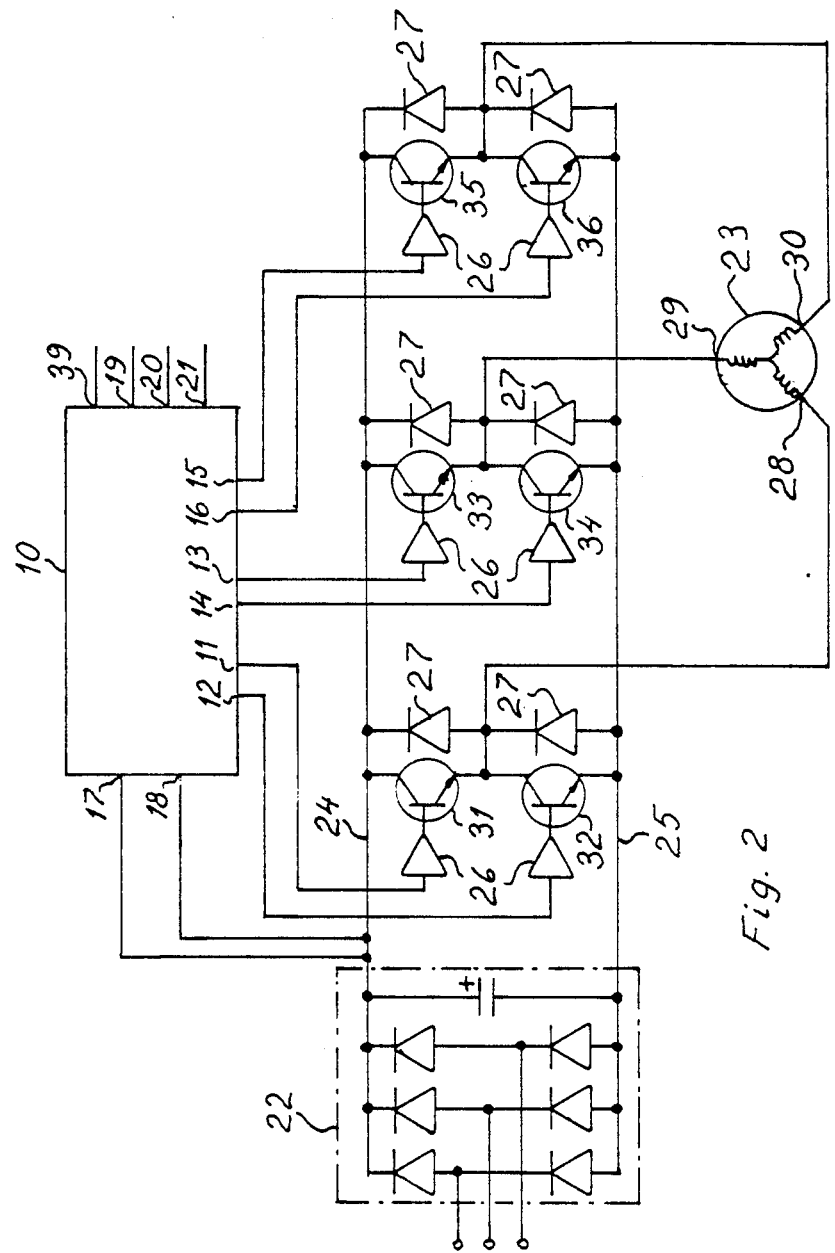
Figure 3:
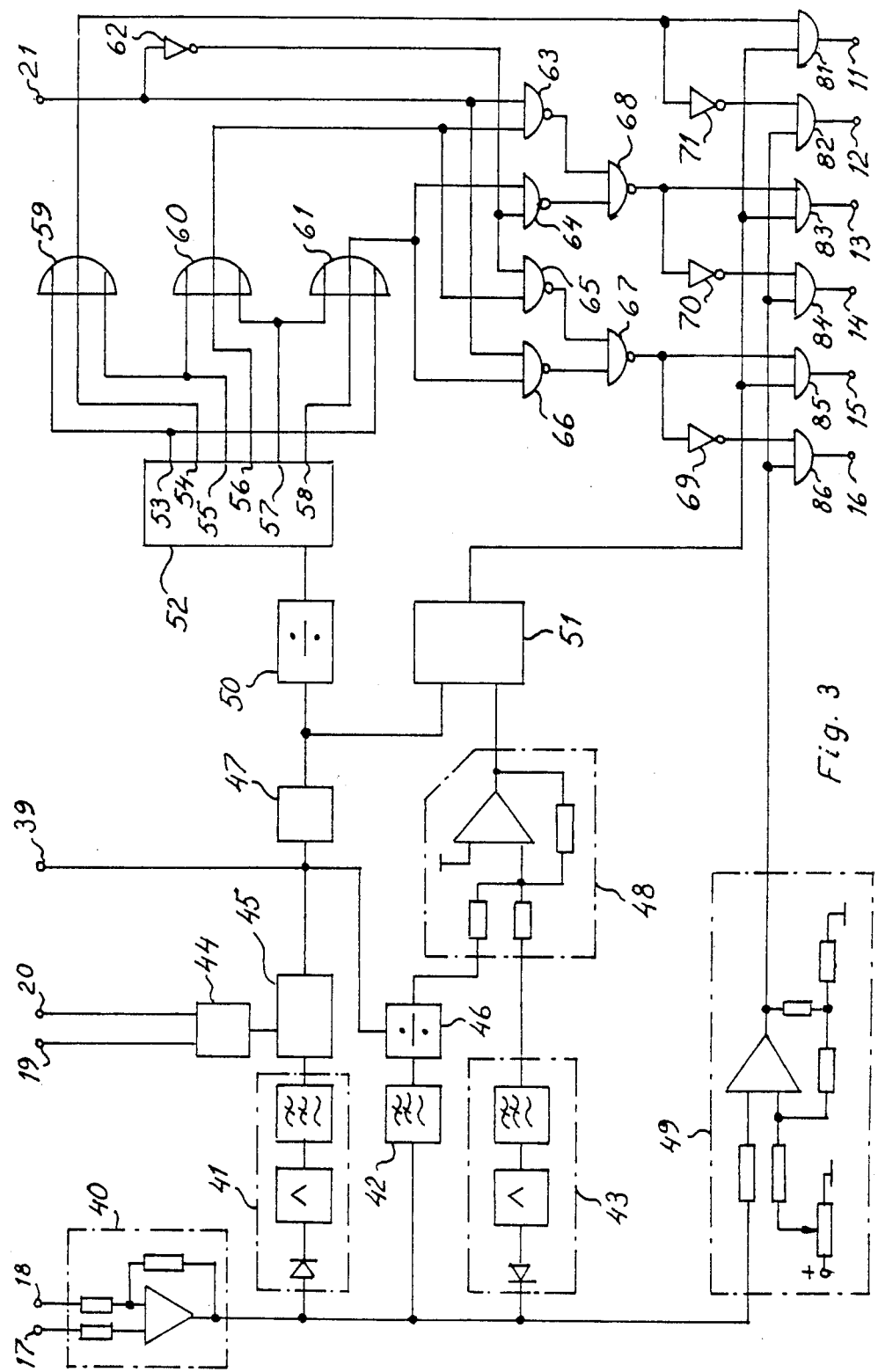
Figure 4:
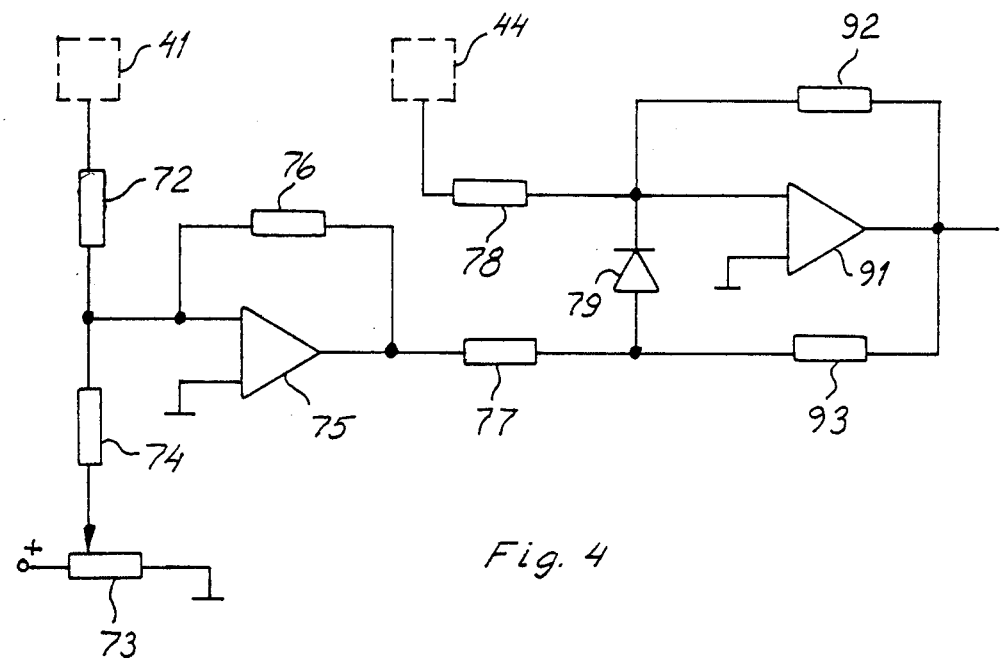
Figure 5:
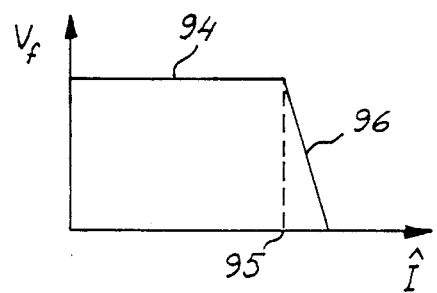

An embodiment of the invention is described below with reference to the accompanying drawings in which FIG. 1 shows a washing machine with part of the control system.
FIG. 2 shows the motor drive system.
FIG. 3 shows the controller of FIG. 2.
FIG. 4 shows a regulator of FIG. 3.
FIG. 5 shows a transfer function for the regulator according to FIG. 4.

The embodiment of the invention shown in FIG. 1 comprises a washing machine 201. This is only an example. The invention can be applied to virtually any machine using a brushless alternating current motor. The washing machine of FIG. 1 includes the motor, the inverter and other power circuits feeding the motor and the major part of the control system. These parts are described more in detail in connection with FIGS. 2-5. Washing machine 201 is provided with an input 19 for the supply of a frequency demand signal. This signal is delivered by a timer 202 in which the washing program is stored. The frequency demand signal is the basic demand for rotational speed. Timer 202 also delivers start signals to input 20. Washing machine 201 is further provided with an input 21 for the selection of rotational direction and an output 39 which delivers a signal corresponding to the rotational speed of the motor. When the rotational speed of the motor in the washing machine is substantially zero output 39 becomes logical zero. Only then is the signal fed to input 21 allowed to change its logical state so that a start signal from timer 202 will cause rotation in the opposite direction.

The drive system shown in FIG. 2 comprises a three-phase rectifier 22 which is connected to a standard fixed frequency mains supply. The rectifier delivers direct current of substantially constant voltage to conduits 24, 25, which constitute a positive 24 and a negative 25 terminal of a direct current supply for an inverter. The inverter comprises six switching elements 31-36 for successively connecting motor terminals 28, 29, 30 on a brushless alternating current motor 23 to the positive terminal 24 and the negative terminal 25 of the direct current supply. The switching elements are in the drawing shown as transistors but could, of course, be combinations of thyristors or other elements. A diode 27 is placed in anti-parallel over each transistor to take care of reactive currents at the switching off of the transistor. To control the inverter, control signals are supplied from outputs 11-16 on a controller 10 as shown in FIG. 3. These control signals are supplied via amplifiers 26 to the bases of respective transistors. Controller 10 is provided with inputs 17, 18 through which the direct current in conduit 24 is sensed. Controller 10 is further provided with an output 39 and inputs 19, 20, 21. Output 39 is only used if it during operation is desired to change the direction of rotation of the motor. The direction of rotation is selected by applying a logical signal to input 21. If rotation in only one direction is desired input 21 is connected either to a positive voltage or common. The speed of motor 23 may be changed by variation of a voltage applied to input 19. If, as for instance in a grinding machine, it is desired to drive the motor at a certain speed, input 19 is connected to a suitable voltage corresponding to the desired speed. Input 20 is intended for receiving a start/stop signal by which rotation or no rotation is chosen.

Controller 10, which is shown more in detail in FIG. 3, comprises a sensing means 40 for sensing the direct current in conduit 24. This current is presented as a voltage between inputs 17 and 18. The output signal of sensing means 40 is applied to a first peak detector 41, a low-pass filter 42, a second peak detector 43 and a comparator 49. Peak detectors 41 and 43 comprise diodes to react on positive and negative signals respectively. The peak detectors also comprise low-pass filters. First peak detector 41 preferably has a time constant of about 4/f where f is the maximum fundamental frequency of the current supplied to motor 23. The cut-off frequency, −3 dB, of peak detector 41 is preferably about 0.1f. Lowpass filter 42 preferably has about the same cut-off frequency. Second peak detector 43 preferably has a time constant of about 1/f and a cut-off frequency of about 0.5f.

The peak value signal from peak detector 41 is supplied to a first regulator 45, which is shown more in detail in FIG. 4. Input signals from inputs 19 and 20 are supplied to a means 44 in form of a ramp generator. Ramp generator 44 comprises one or two operational amplifiers connected as integrators to supply regulator 45 with an increasing ramp voltage at motor start acceleration and a decreasing ramp voltage at motor stop deceleration. In this way it is possible to avoid that the normal speed maximum load current is exceeded when the motor is started or stopped. A change in the speed demand signal at input 19 is also integrated by ramp generator 44. Thus it takes some time before the output of ramp generator 44 becomes fully adapted to the input signals.

The peak value signal from first detector 41 is applied to one of the inputs of operational amplifier 75 via resistor 72. This signal is compared with a reference signal preset on variable resistor 73 and fed to the amplifier via resistor 74. The amplifier is provided with a feed-back resistor 76. The output signal of amplifier 75 is via a resistor 77 applied to diode 79. The output signal from ramp generator 44 is via resistor 78 supplied to one of the inputs of operational amplifier 91. Amplifier 91 is provided with a first feed-back resistor 92 and a second feed-back resistor 93 in series with diode 79. Resistor 93 has a much lower resistance than resistor 92. Preferably the ratio is about 1/20. If the output signal from amplifier 75, measured at diode 79, is more negative than the output signal from amplifier 91, measured at diode 79, is positive, diode 79 is reverse-biased. The closed loop amplification of amplifier 91 is then high. Regulator 45 then operates according to line 94 in FIG. 5, assuming constant signal from ramp generator 44. If the signal from first peak detector 41 increases, the output signal from amplifier 75 becomes less negative and at a certain signal level, level 95 in FIG. 5, which is preset on resistor 73, diode 79 becomes forward-biased. The closed loop amplification of amplifier 91 is now drastically reduced so that first regulator 45 delivers a frequency controlling signal according to line 96 in FIG. 5. This signal becomes zero at about 120% of the signal at level 95. The frequency controlling signal from the output of amplifier 91 is delivered to a voltage-controlled oscillator 47, output 39 and an analog divider 46, e.g. Analog Devices AD 534. The voltage-controlled oscillator produces an output signal whose frequency is proportional to the input voltage.

The rectified mean value signal obtained from low-pass filter 42 corresponds to the power supplied to motor 23 because the voltage of the direct current supply 24, 25 is substantially constant. This signal is supplied to divider 46 where it is divided with the frequency controlling signal, which is the demand signal for rotational speed of motor 23. The output signal of divider 46 will thus correspond to the torque demand from motor 23. This output signal, first voltage controlling signal, is supplied to a second regulator 48. The negative peak value signal, second voltage controlling signal, obtained from second peak detector 43 is also supplied to regulator 48 so that the output signal of regulator 48 becomes proportional to the difference between the first and the second voltage controlling signals. The negative peak value signal from peak detector 43 corresponds to the degree of magnetization of motor 23. This signal is obtained from negative pulses which are fed back to the direct current source when the transistors 31–36 are switched off. By controlling the level of these negative pulses it is possible to obtain a predetermined level of magnetization of the motor allowing both a high power to weight ratio and the avoiding of oversaturation, which would give unacceptable losses.

If the signal from sensing means 40 exceeds a predetermined level the output of comparator 49 becomes low. As a result outputs 12, 14 and 16 of AND gates 82, 84 and 86 respectively will be low. This means that the lower transistors 32, 34 and 36 of the inverter will be turned off so that the motor terminals 28, 29 and 30 will be cut off from the negative terminal 25 of the direct current supply. This cutting off thus functions as transient current protection for the inverter.

The output signal from voltage-controlled oscillator 47 is supplied to a timer 51, preferably an industrial timer of standard type 555, and to a divider 50. Divider 50 is preferably a programmable counter which delivers a pulse train having a frequency which is equal to the frequency of the input signal divided by a chosen constant. Timer 51 delivers a pulse train whose frequency is equal to the frequency of the output signal from voltage-controlled oscillator 47. The pulse width is controlled by the output signal from second regulator 48. This pulse train is supplied to AND gates 81, 83 and 85. The pulse train from divider 50 is supplied as clock signal to ring counter 52. In the ring counter a 1 and five 0's are stored. The 1 is shifted around by the pulse train from outputs 53 through 58 and back to 53. This makes one period of the fundamental frequency of the current supplied to motor 23. Outputs 53–58 of ring counter 52 are decoded by OR gates 59, 60 and 61. The output of each of these gates is high half the time and low half the time. A logic signal inverter 62 and NAND gates 63–68 are provided for selecting direction of rotation of motor 23. The output signals of gates 59, 60 and 61 are supplied to AND gates 81–86 for controlling the actuation of switching transistors 31–36 in the inverter. The inputs of gates 82, 84 and 86 are provided with logic signal inverters 71, 70 and 69 respectively.

Because the pulse width of the pulses leaving timer 51 remains constant independent of frequency if the signal from regulator 48 is constant, the mean value over half a period of the fundamental frequency of the voltage applied to any of the motor terminals will change simultaneously with the frequency as required by basic electromagnetic laws. Additional control of the mean value voltage is obtained by variation of the pulse width, which is controlled by regulator 48.

We claim:

1. A method for controlling a brushless AC motor driven by an inverter having switching means, said inverter being connected to a DC supply whereby alternating current fed to the AC motor terminals is provided by the controlled actuation of said switching means to successively connect the motor terminals to the positive and negative terminals of said direct current supply comprising the steps of:

directly sensing the direct current supplied to said inverter for providing a sensed current signal, applying said sensed current signal to a first peak detector having a predetermined time constant for obtaining a first peak value signal, applying said first peak value signal to a first regulator for generating a frequency control signal for controlling the frequency of said alternating current, decreasing said frequency control signal of said first regulator when said first peak value signal exceeds a predetermined value, passing said sensed current signal through a low pass filter to obtain a mean value signal, dividing said mean value signal by said frequency control signal to derive a first voltage control signal, applying said first voltage control signal to a second regulator for providing an output signal which varies in amplitude in the same direction as said first voltage control signal, and controlling said alternating current with said output signal.

2. The method as claimed in claim 1, including the steps of:

applying said sensed current signal to a second peak detector for obtaining a second peak voltage signal from negative pulses appearing in said sensed signal when said switching means are turned off, and applying said second peak voltage signal to said second regulator such that the change in amplitude of said output signal is opposite to the change caused by said first peak voltage signal.

3. The motor control circuit as claimed in claim 1 having:

a low pass filter connected to said sensing means for producing a mean value signal in accordance with the sensed current, a divider connected to said low pass filter and to said first regulator for producing a first voltage control signal by dividing said mean value signal by said frequency control signal, a second regulator connected to said divider for producing an output signal whose amplitude varies in the same direction as first voltage control signal, means for coupling said output signal to said switching means for controlling the time said switching means are turned on.

4. The motor control circuit as claimed in claim 3 having a second peak detector connected to said sensing means for producing a second control signal in accordance with negative pulses detected when said switching means are turned off, and means for connecting said second regulator to said second peak detector for providing an output signal from said second regulator having an opposite amplitude from that provided from said first control signal.

* * * * *